United States Patent [19]
Ito et al.

[11] Patent Number: 5,103,319
[45] Date of Patent: Apr. 7, 1992

[54] IMAGE PROCESSING CONDITION SETTING APPARATUS

[75] Inventors: Shinji Ito; Yuji Mizuno; Junichi Masuo; Teruo Fujii, all of Kyoto, Japan

[73] Assignee: Dainippon Screen Mfg. Co., Ltd., Kyoto, Japan

[21] Appl. No.: 571,488

[22] Filed: Aug. 22, 1990

[30] Foreign Application Priority Data

Sep. 21, 1989 [JP] Japan .................... 1-110536[U]

[51] Int. Cl.$^5$ .................................................. H04M 1/04
[52] U.S. Cl. .................................... 358/406; 358/448; 358/453; 358/455; 358/496
[58] Field of Search ............... 358/406, 448, 453, 455, 358/496, 498; 382/50, 65

[56] References Cited

U.S. PATENT DOCUMENTS

| | | | |
|---|---|---|---|
| 3,629,495 | 12/1971 | Cahill | 358/496 |
| 3,783,295 | 1/1974 | Casler | 382/65 |
| 3,853,403 | 12/1974 | Bentley | 382/65 |
| 4,635,130 | 1/1987 | Oi | 358/498 |
| 4,704,637 | 11/1987 | Mizuno | 358/466 |
| 4,907,286 | 3/1990 | Yamada | 358/456 |

Primary Examiner—Michael Razavi
Attorney, Agent, or Firm—Lowe, Price, LeBlanc & Becker

[57] ABSTRACT

A setup apparatus constructed separately from an image scanning and recording apparatus. Light from a document is received by a pickup lens disposed above the document, and is branched by suitable optics. One of the branched incident beams is projected to a focusing screen disposed adjacent the pickup lens for displaying an erect image of a setup position. The other beam is passed through an aperture disposed at an optically equivalent position to the focusing screen, from which density level of the setup position is measured for display on a density indicator.

7 Claims, 6 Drawing Sheets

F : DOCUMENT
35 : PICKUP LENS
36 : FOCUSING SCREEN
37 : DENSITY INDICATOR

36: FOCUSING SCREEM

35: PICKUP LENS

46: APERTURE

43: HALF MIRROR

IMAGE PROCESSING CONDITION SETTING APPARATUS

BACKGROUND OF THE INVENTION (1) Field of the Invention

The present invention relates to an apparatus for setting image processing conditions in scanning and recording documents with an image scanning and record-recording apparatus such as a prepress scanner. More particularly, the invention relates to an apparatus for setting image processing conditions, which is constructed separately from the image scanning and recording apparatus.

(2) Description of the Related Art

In scanning and recording a document with a prepress scanner, for example, density levels (normally in dot %) of selected positions, e.g. such as highlight points and shadow points, of the document are set as image processing conditions (hereinafter referred to as "setup") in advance in order to reproduce the document in a desired state.

An ordinary prepress scanner has such a setup function. FIG. 1 illustrates an outline of the setup function which the prepress scanner possesses.

In FIG. 1, light transmitted through or reflected by document F mounted on a rotary cylinder 1 travels through a pickup lens 2 and to a total reflection mirror 3 pivotable between an open position and a closed position. During a setup time the total reflection mirror 3 is opened to allow the light to travel to a viewer 4. The operator moves the rotary cylinder 1 and pickup lens 2 while watching the documents F through the viewer 4, to select appropriate positions as hightlight points or shadow points (here-inafter referred to as setup positions).

After setup positions are selected, the total reflection mirror 3 is set to the closed position. Then the light is reflected to the mirror 3 to travel through an aperture 5 and enter a color separating optical system 6 including a red reflection dichroic mirror 6a, a blue reflection dichroic mirror 6b, and a total reflection mirror 6c. Color components of red (R), green (G) and blue (B) emerging from the color separating optical system are converted into electric signals by photomultipliers 7a, 7b and 7c, respectively, which are inputted to a computing circuit 8. The computing circuit 8 converts the R, G and B signals into yellow (Y), magenta (M), cyan (C) and black (K) color signals. These color signals are converted into density levels (normally dot %) and shown on a density indicator 9. The operator views the density levels of the respective color signals shown on the density indicator 9, and judges whether the selected setup positions are appropriate or not. If the selected positions are found appropriate, the operator inputs desired density levels of these positions through a keyboard 10. The input density levels are set to the computing circuit 8 as image processing conditions, which completes the setup operation.

Conventionally, the setup operation by means of the scanner as described above is followed by scanning and recording of the document with the same scanner. Otherwise the scanner is used exclusively for the setup purpose, document reading and recording being carried out with a different scanner. In the former, the document cannot be read or recorded during the setup operation, resulting in a low operating rate of the scanner. The latter requires a plurality of expensive prepress scanners, which is a disadvantage from the cost point of view.

Under the circumstances, apparatus intended specially for setup have been proposed, which are of separate entity from the prepress scanner and which are relatively inexpensive and yet have good operability although not attaining as high precision as the prepress scanner does (see Japanese Patent Laying-Open Publication No. 62-231566, for example). In this specification, such a setup dedicated apparatus is called an image processing condition setting apparatus.

As shown in FIG. 2, an image processing condition setting apparatus comprises a chuck 11 rotatably supporting a rotary cylinder 1 carrying a document, and a viewer 12 slidable along a rotation axis of the chuck 11. The chuck 11 and viewer 12 have position detectors, not shown, for detecting positions thereof. respectively. As shown in FIG. 3, the viewer 12 includes a light source 13, a condenser lens 14, a mask 15 defining a register cross M, a projecting lens 16, a half mirror 17 and a lens 18. The register cross M drawn of the mask 15 is projected to the document F to enable visual confirmation of setup positions.

The operator sets the register cross M to a setup position by rotating the cylinder 1 (and chuck 11) and sliding the viewer 12, and inputs a desired density level of that position through a keyboard 19. The input density level is recorded, along with position data of that position as detected by the position detectors, on a floppy disk inserted into a disk drive 20 or other storage medium.

After necessary image processing conditions are written into the floppy disk, the latter is set to the prepress scanner. In this way, the image processing conditions set by the image processing condition setting apparatus are retrieved by the prepress scanner.

The setup positions on the document F are selected by the operator based on his or her experience. It is desirable to determine whether the selected setup positions are actually suitable as highlight points or shadow points or not, by referring to density levels of the color components of those positions. This is because, if a position selected as a highlight point, for example, shows an imbalance of color, that position is inappropriate as a highlight point, and its use would mar the image quality of a printout.

With the known apparatus illustrated in FIG. 2, however, the density level of a selected position cannot be confirmed. After a setup operation by this apparatus, the prepress scanner is operated to measure the density level of that position for checking if that position is appropriate as a setup position. If inappropriate, a setup operation must be carried out with the prepress scanner all over again.

Besides, as noted with reference to FIG. 1, an attempt to check the density levels of a plurality of positions on a document with the conventional prepress scanner involves the trouble of manually opening and closing the total reflection mirror 3 every now and again. Such an operation is time-consuming and unfavorable for the efficiency of the prepress process.

In the prepress scanner schematically shown in FIG. 1, the total reflection mirror 3 must be opened and closed for confirming the density level of a highlight point or the like as one step of the setup operation for the following reason:

In the prepress scanner, generally, the size of aperture 5 which determines a document input range in the color separating optical system 6 is varied with image processing (reproducing) magnification. Particularly when the magnification is at a high ratio, the size of aperture 5 is reduced to the order of 0.1 mm in diameter. As a result, minimal light intensity is applied through the color separating optical system 6 to the photomultipliers 7a–7c. Because of the limitation to the light sensitivity of these photomultipliers 7a–7c, the light cannot be led simultaneously to the viewer 4 and to the color separating optical system 6. As a consequence, the total reflection mirror 3 must be used to switch the optical path.

In addition, since the total reflection mirror 3 is switched between the open and closed positions, the operator often fails to notice a slight movement of the document-carrying cylinder or scanning head occuring before or after a switching operation. This results in a shift between an input range observed through the viewer 4 and an output range for which the density is actually measured. The staggered portions may have a density discrepancy, which will frustrate the operator in his attempt to correctly effect a desired setup.

SUMMARY OF THE INVENTION

The present invention has been made having regard to the state of the art noted above. An object of the present invention, therefore, is to provide an image processing condition setting apparatus which enables easy and accurate confirmation of the density levels of selected positions on a document for setting image processing conditions.

Other objects of the invention will be apparent from the following description.

The above objects are fulfilled, according to the present invention, by an image processing condition setting apparatus constructed separately from the an image scanning and recording apparatus for transferring image processing conditions of a document to the image scanning and recording apparatus, comprising a document supporting device, a pickup device disposed above and directed downwardly toward the document supported by the document supporting device, an image checking device disposed adjacent the pickup device, an optical path branching member for branching incident light received thereby through the pickup device, an optical device for projecting one of the branched light beams as an erect image to the image checking device, a density measuring device for receiving, through an aperture disposed at a position optically equivalent to the image checking device, the other light beam branched off by the optical path device and measuring density of the document, and a density display device for displaying the density measured by the density measuring device.

According to the present invention, light transmitted through or reflected by a document is received by the pickup device, and is branched to travel along two optical paths. One of the branched incident beams is projected to the image checking device as an erect image. The operator selects a setup position by looking at this erect image. The other incident beam is passed through the aperture to be received by the density measuring device where the density level of the setup position is measured for display on the density display device. The operator checks the density level displayed and the input range shown on the image checking device to determine whether the selected position on the document is suitable as a setup position.

As will be understood from the above description, the present invention produces the following effects:

(1) The density measuring device and density display device allow the operator to determine immediately, by viewing the density level displayed on the display device, whether the selected position on the document is suitable as a highlight point or a shadow point. This enables a correct setup operation, and promotes efficiency of a prepress operation since it is no longer necessary to carry out confirmation with the image scanning and recording apparatus such as a prepress scanner as practiced in the prior art.

(2) The feature that one of the branched incident beams is directed to the image checking device and the other to the density measuring device dispenses with the irksome operation of switching a total reflection mirror as in the known construction shown in FIG. 1. The density level of a selected position on the document is determined promptly by its positional adjustment on the image checking device, which promotes efficiency of the setup operation.

(3) The setup operation is greatly facilitated since the pickup device is disposed above and directed downwardly toward the document and since the image checking device is disposed adjacent the pickup device. That is, the operator can easily check the position of illuminating light on the document immediately under the pickup device. Accurate positioning on the image checking device can be confirmed simply by looking slightly sideways from the document.

(4) The erect image of a selected position on the document appearing on the image checking device allows the operator to carry out a setup operation with ease since the positioning step taken by looking at the erect image does not give the operator a feeling being "out of touch." Besides, a slight movement of the document supporting device or the pickup device is reflected on the image checking device, which will readily come to the operator's notice.

(5) Where the image checking device includes a surface defining a register mark for visually checking a document density measurement range corresponding in size to or slightly larger than the aperture, positioning may be made to place a highlight point or a shadow point in the register mark. This allows the setup operation to be carried out with speed and accuracy.

(6) Where the density display device is disposed adjacent to the image checking device, positioning of a setup position and observation of its density level may be carried out promptly.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIGS. 1 through 3 show conventional apparatus, in which:

FIG. 1 is an explanatory view of the setup function of a conventional prepress scanner;

FIG. 2 is a perspective view of a conventional image processing condition setting apparatus; and FIG. 3 is a schematic view of a viewer included in the apparatus shown in FIG. 2.

FIGS. 4 through 10 show an image processing condition setting apparatus of the rotation scanning type according to the present invention, in which FIG. 4 is a perspective view of the image processing condition setting apparatus;

FIG. 5 is a block diagram of a constructional outline of the apparatus shown in FIG. 4;

FIG. 6 is a explanatory view of a front panel of an image reading head;

FIG. 7 is a perspective view showing the interior of the image reading head;

FIG. 8 is a perspective view seen from below of a pickup lens and adjacent optics;

FIG. 9 is an explanatory view of optical paths inside the image reading head; and FIG. 10 is a view showing relationship between a register mark of a focusing screen and an aperture.

DESCRIPTION OF THE PREFERRED EMBODIMENTS

Preferred embodiments of the present invention will be described in detail hereinafter with reference to the drawings.

Figure 1:
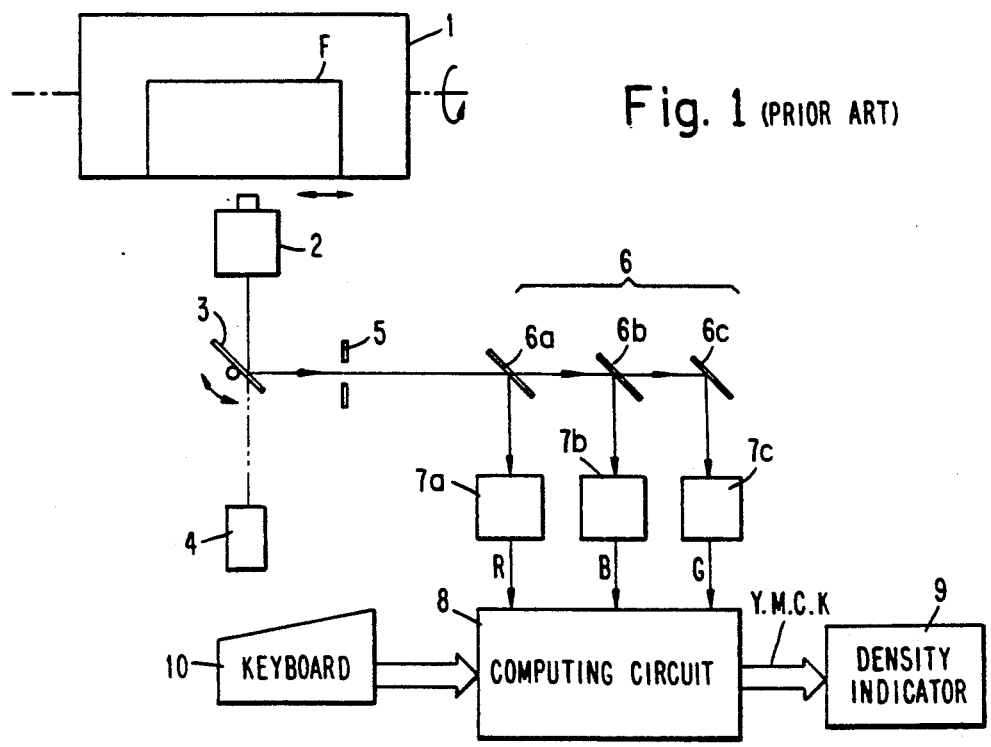
Figures 2, 3:
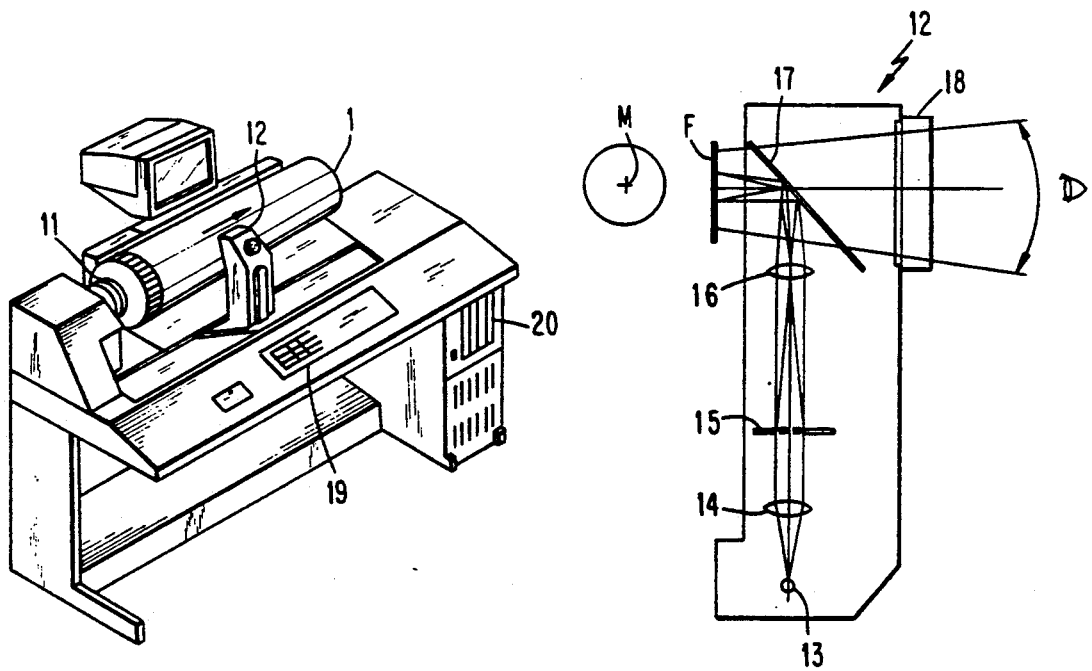
Figure 4:
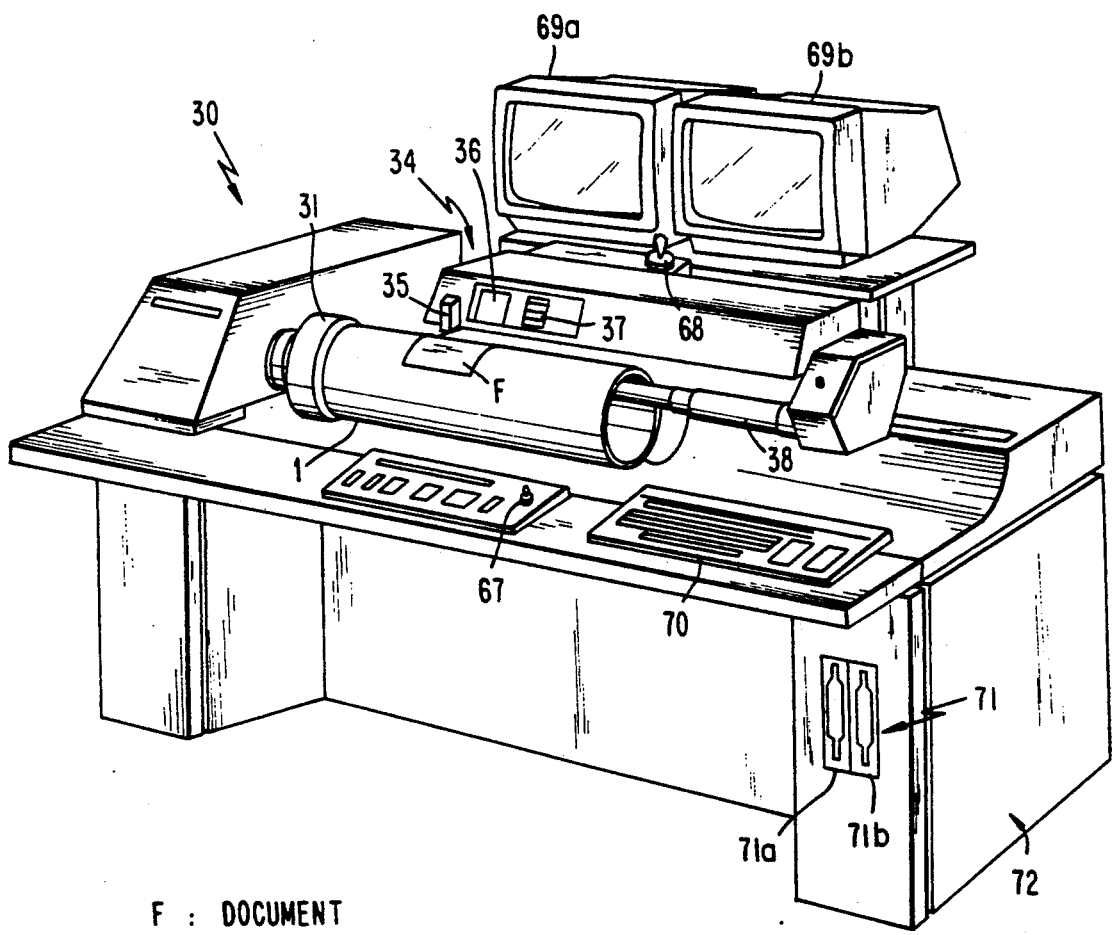
Figure 5:
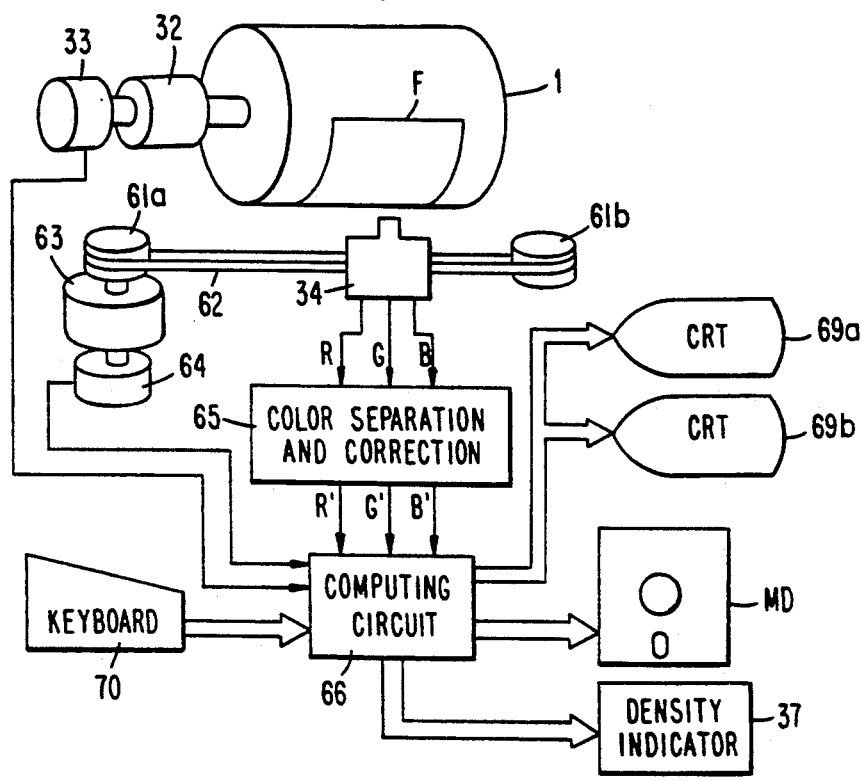

Reference is made to FIGS. 4 and 5. FIG. 4 is a perspective view of an image processing condition setting apparatus. FIG. 5 is a block diagram showing a constructional outline of the apparatus.

A rotary cylinder 1 carrying a document F is horizontally detachably attached to a chuck 31 which is part of an apparatus body 30. As shown in FIG. 5, the chuck 31 is rotatable by a motor 32, and an amount of its rotation is detected by a rotary encoder 33. The apparatus body 30 includes an image reading head 34 movable along a rotation axis of the rotary cylinder 1. A pickup lens 35 directed downwardly is disposed forwardly of the image reading head 34 and above the document F. A focusing screen 36 is disposed close to and laterally of the pickup lens 35, and a density indicator 37 is disposed side by side with the focusing screen 36.

Figure 6:
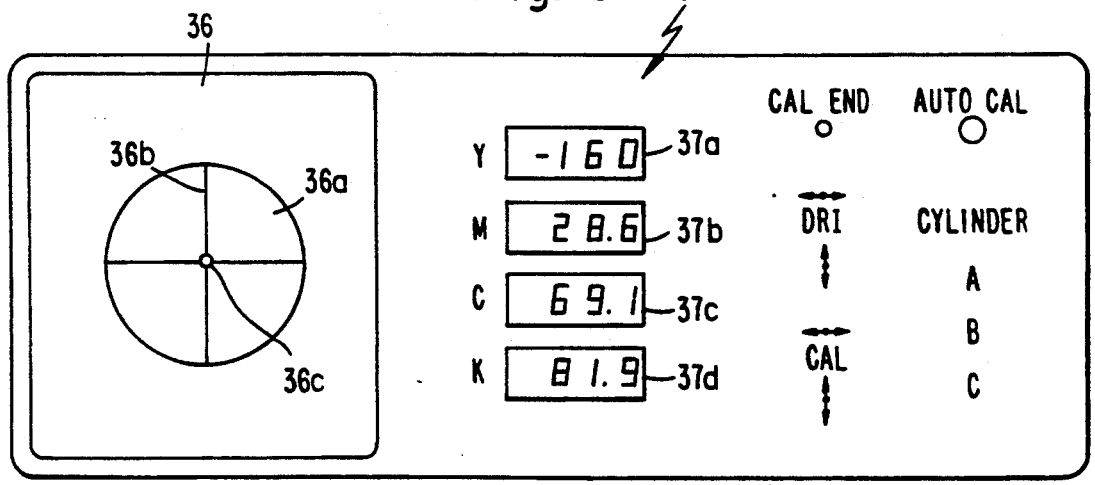

FIG. 6 is a plan view of a front panel on which the focusing screen 36 and density indicator 37 are arranged. The focusing screen 36 has a circular light transmission portion 36a including a register cross 36b. A round register mark 36c is drawn at the center of the register cross 36b. The density indicator 37 includes density displays 37a–37d for displaying density levels of yellow (Y), magenta (M), cyan (C) and black (K) components in dot %, respectively. The entire front panel is inclined about 20 degrees rearwardly from the vertical plane, with the focusing screen 36 inclined about 30 degrees rearwardly, to facilitate viewing by the operator.

A lay pipe 38 is connected to the image reading head 34 for guiding light emitted from a light source, not shown, into the rotary cylinder 1. The light exiting the lay pipe 38 is transmitted through the document F to impinge on the pickup lens 35. In the case of a reflection type document, light from the light source is guided through an optical fiber to be projected from a bottom region of the pickup lens 35, the reflected light being received by the pickup lens 35.

Figure 7:
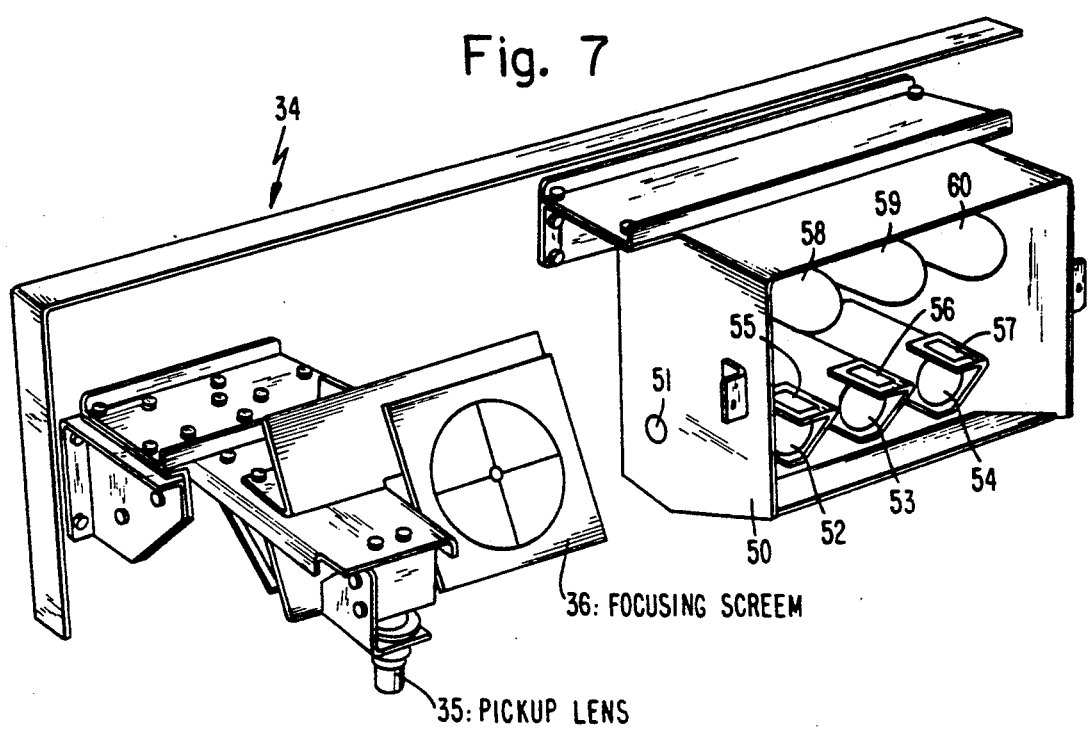
Figure 8:
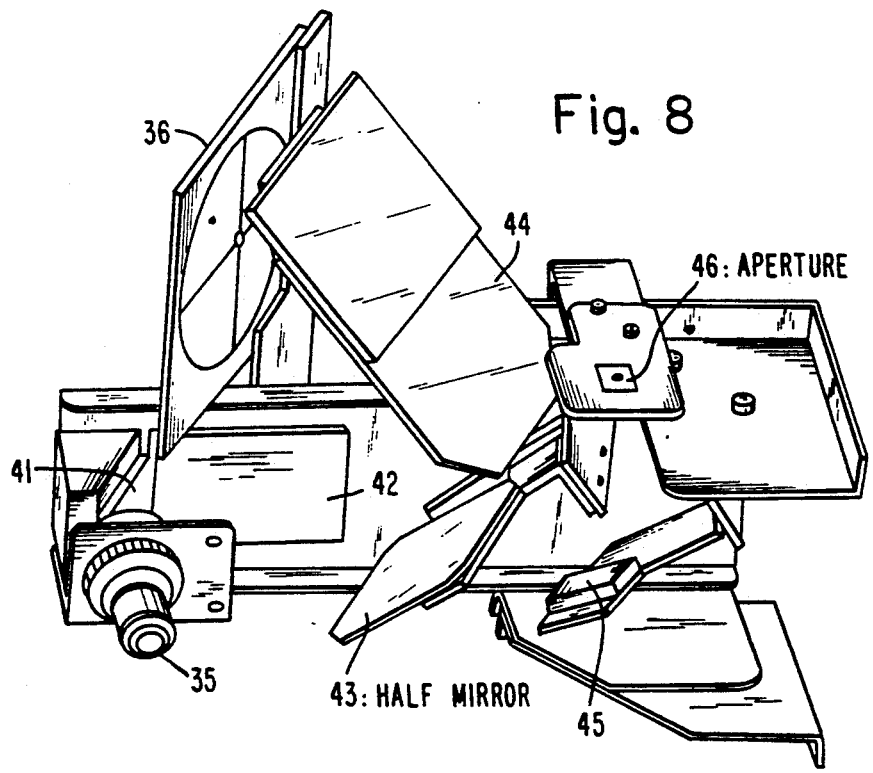
Figure 9:
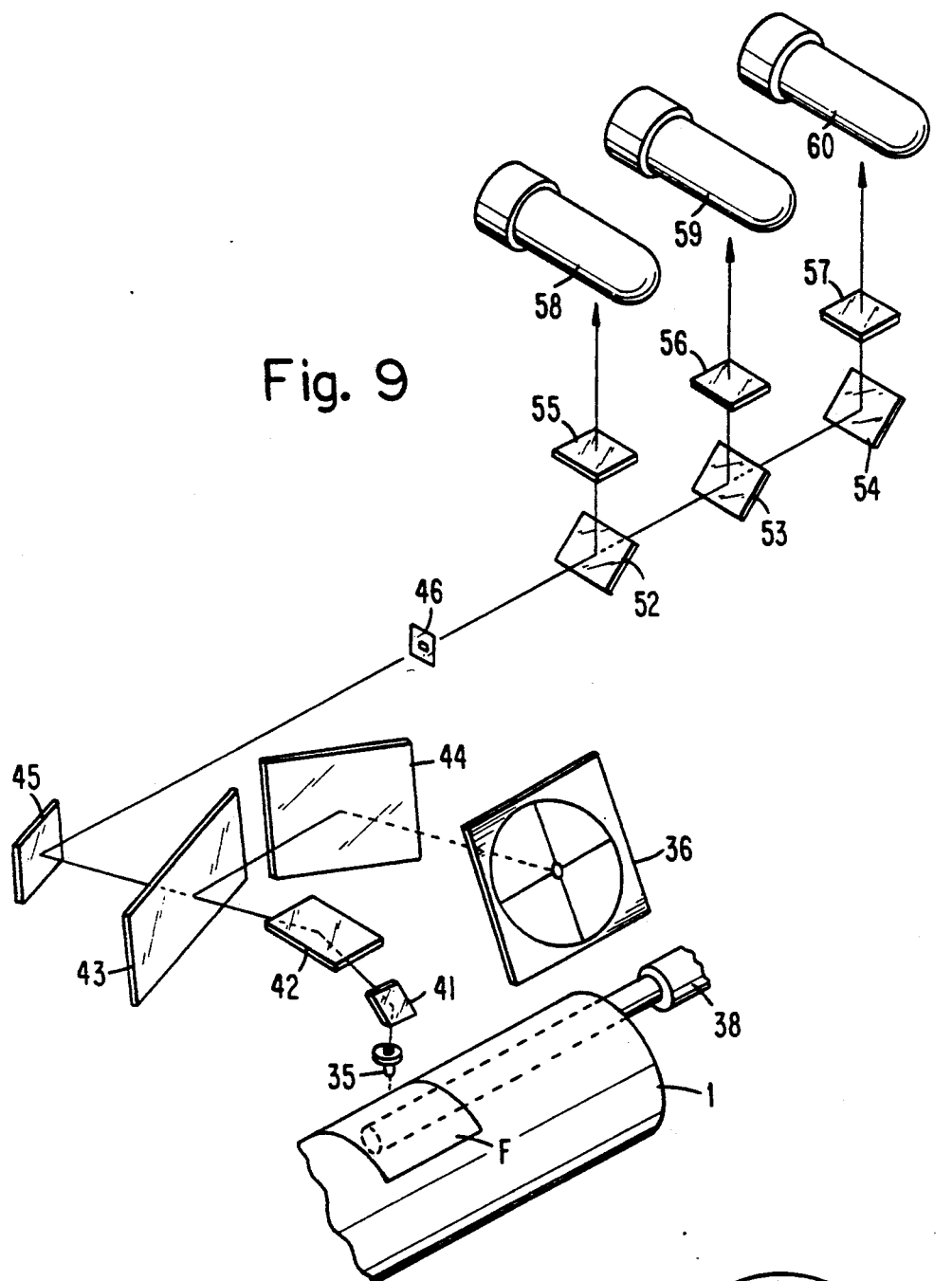

FIGS. 7 through 9 show the interior of the image reading head 34. FIG. 7 is a perspective view with the front panel of the image reading head 34 removed. FIG. 8 is a perspective view seen from below of the pickup lens 35 and adjacent optics. FIG. 9 is an explanatory view of optical paths inside the image reading head 34.

The image reading head 34 includes a total reflection mirror 41, a total reflection mirror 42, a half mirror 43, a total reflection mirror 44, a total reflection mirror 45 and an aperture 46 arranged adjacent the pickup lens 35 in positional relations as shown in FIG. 8. The focusing screen 36 and aperture 46 are located at optically equivalent positions.

As shown in FIG. 9, the light exiting the lay pipe 38 travels through the transmission type document F to the pickup lens 35. This apparatus has an illuminating area of greater diameter than that of the prepress scanner to facilitate a setup operation. Specifically, the illuminating light of the prepress scanner normally has an area diameter of about 0.5 mm whereas the illuminating light of this apparatus has an area diameter set at about 3.5 mm. This is because the prepress scanner uses a small aperture for a high magnification ratio and light intensity must be increased accordingly, and the illuminating light is sufficiently restricted for this purpose. By contrast, it is unnecessary for the apparatus of this embodiment to take magnification changes into account and, therefore, one aperture (i.e. aperture 46) is sufficient. This allows the aperture size to be set to a relatively large 2×2 mm. With the large aperture 46, the illuminating light has an increased area diameter as noted above. Consequently, a relatively large image embracing a setup position and adjacent areas is projected to the focusing screen 36, which facilitates confirmation of the setup position located inside the register mark 36c at the center of the focusing screen 36.

The light entering the pickup lens 35 is successively reflected by the total reflection mirrors 41 and 42 to proceed to the half mirror 43. The half mirror 43 has transmittance set to 50% in view of the influence of noise at a photoelectric converter described later and to enhance visibility of the image projected to the focusing screen 36. However, the transmittance is not limited to 50% but may be 60% or 70%, for example. The light reflected by the half mirror is projected to the focusing screen 36 through the total reflection mirror 44. The light transmitted through the half mirror 43 travels to the aperture 46 through the total reflection mirror 45.

In this embodiment, the incident light is reflected by the four (i.e. a plural number) mirrors 41, 42, 43 and 44 for projection to the focusing screen 36 located close to and laterally of the pickup lens 35. This arrangement can readily project an erect image of a setup position to the focusing screen 36.

Figure 10:
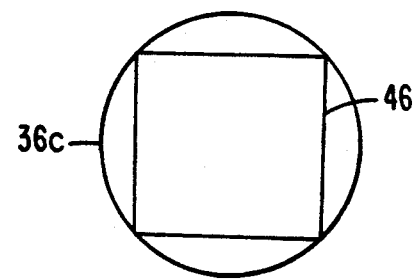

The aperture 46 and focusing screen 36 are positioned at substantially the same distance from the pickup lens 35, respectively. The register mark 36c of the focusing screen 36 is the same size as or slightly larger than the aperture 46. As shown in FIG. 10, the register mark 36c in this embodiment is in the form of a large circle circumscribing the 2×2 mm aperture 46. With the aperture 46 and register mark 36c arranged in this relationship, the operator can clearly confirm a region of the document for density measurement, i.e. a region of the document projected through the aperture 46, on the focusing screen 36. Thus, positional adjustment of a setup position may be effected with ease. If the register mark 36c were smaller than the aperture 46, the aperture would permit projection therethrough of image regions surrounding an appropriate setup position set within the register mark 36c. In the event of a color imbalance occurring in the surrounding regions, an inappropriate density level would be regarded as valid to deteriorate the quality of a reproduced image.

The light emerging from the aperture 46 proceeds to the photoelectric converter through a bore 51 defined in a wall of a housing 50 as shown in FIG. 7. The red component is reflected by a dichroic mirror 52 to proceed through a filter 55 to a photomultiplier 58. The blue component is reflected by a dichroic mirror 53 to proceed through a filter 56 to a photomultiplier 59. The green component is reflected by a total reflection mirror 54 to proceed through a filter 57 to a photomultiplier 60. The respective color components are then converted into red (R), green (G) and blue (B) signals by photoelectric conversion.

As shown in FIG. 5, the image reading head 34 having the above construction is connected to a steel belt 62 wound around pulleys 61a and 61b. The pulley 61a is driven by a motor 63 to move the image reading head 34 horizontally. An amount of rotation of the motor 63 is detected by a rotary encoder 64. A screw feed mechanism may be employed for driving the image reading head 34 instead. However, a screw feed mechanism would complicate the construction and entail reduced positioning precision due to a backlash of the screw since the image reading head 34 is moved right and left in selecting a setup position. It is therefore preferable to employ a drive mechanism using the steel belt 62 as noted above.

The R, G and B signals produced through the photoelectric conversion in the image reading head 34 are applied to a color separation and correction circuit 65. The photomultipliers and an analog signal processing system for processing the output signals of the photomultipliers in the image processing condition setting apparatus have not always the same characteristics as those of their counterparts in the prepress scanner. The color separation and correction circuit 65 is provided in order to compensate for the difference in such characteristics. The color separation and correction circuit 65 may be omitted where the apparatus is so constructed that the above characteristics are the same, or where the prepress scanner includes a similar circuit. In this sense, the color separation and correction circuit 65 is not an essential feature of the present invention.

The color signals are output as appropriately compensated color signals R', G' and B' from the color separation and correction circuit 65, which are applied to a computing circuit 66. The computing circuit 66 converts these color signals R', G' and B' into yellow (Y), magenta (M), cyan (C) and black (K), and outputs these colors with the respective density levels expressed in dot % to the density indicator 37.

Reverting to FIG. 4, the apparatus body 30 further includes the following components:

A joy stick 67 is provided for controlling the image reading head 34. Right and left movement of the joy stick 67 actuates the motor 63 shown in FIG. 5 to move the image reading head 34 right and left. Fore and aft movement of the joy stick 67 actuates a lift mechanism, not shown, to move the image reading head 34 up and down. The image reading head 34 includes a fine height adjusting handle 68 provided at a top position thereof.

The apparatus body 30 carries two CRTs 69a and 69b mounted on top. One of the CRTs 69a is provided to display an image of a document roughly scanned and read for the operator to confirm the colors. The other CRT 69b displays menu screens for setting various image processing conditions. Various conditions input through a keyboard 70 are displayed on this CRT 69b.

The apparatus body 30 has a leg including a floppy disk driver 71 for driving floppy disks serving as external storage, and a power supply box 72 containing a microcomputer and the like for processing setup data. The floppy disk driver 71 includes an insert slot 71a for receiving a system floppy disk for controlling this apparatus, and an insert slot 71b for receiving a data floppy disk (referenced MD in FIG. 5) which is used to store selected image processing conditions.

Next, the sequence of a setup operation carried out using this apparatus will be described.

Preparatory to data input, the rotary cylinder 1 carrying document F is attached to the chuck 31, and the system floppy disk and data floppy disk are set to the respective insert slots 71a and 71b. Then, the joy stick 67 and fine height adjusting handle 68 are operated to adjust height of the image reading head 34 for focusing the pickup lens 35.

When the system floppy disk is set, a control unit in the power supply box 72 reads a control program from the system floppy disk. Thereafter the operation follows this program to give various displays on the CRT 69b to enable the setup operation. The operator proceeds with data input in an interactive mode.

Specifically, the operator specifies whether the document F is the transmission type or reflection type, and inputs positional data such as the origin of coordinates of the rotary cylinder 1, calibrating positions, and exposing start and end positions. In addition, density levels of highlight points and shadow points are designated as follows:

While watching the illuminating light on the document F, the operator moves the pickup lens 35 to a region considered appropriate as a setup position (e.g. an eye of a figure as an object in the case of highlight setup) by manipulating the joy stick 67 to move the image reading head 34 sideways and by manually rotating the chuck 31. The operator can easily view the position of the illuminating light on the document F since the pickup lens 35 is located above the document F and directed downwardly.

The light transmitted through this region is received by the pickup lens 35, and an enlarged erect image of the region appears on the focusing screen 36. Since the focusing screen 36 is located close to and laterally of the pickup lens 35, the operator has only to look slightly sideways to compare the position of the illuminating light on the document F and the enlarged erect image on the focusing screen 36 for positional adjustment. While watching the image projected to the focusing screen 36, the operator then slightly moves the image reading head 34 and chuck 31 to place the register mark 36c of the focusing screen 36 in the highlight point (e.g. a highlight portion at the center of the eye) within the region roughly positioned previously.

After the positioning of the setup position, the operator looks at the density indicator 37 disposed next to the focusing screen 36 to check the degree and balance of the color components of the selected position. Since the density indicator 37 is disposed close to and laterally of the focusing screen 36, the operator has only to look slightly sideways from the focusing screen 36 to check the density level. If the selected position is appropriate as a highlight point, the operator designates the density level of that position in dot % by pressing keys on the keyboard 70. The designated density level is stored in the data floppy disk MD (FIG. 5). Similarly, an appropriate shadow point is positioned, and a density level of that position is input in dot % for storage in the data floppy disk MD.

When the setup operation is completed through the above sequence, the rotary cylinder 1 and data floppy disk MD are removed from the apparatus body, 30 and subsequently set to the prepress scanner not shown, respectively. Next, a data setting program for the prepress scanner is started to load the image processing conditions from the data floppy disk MD into the scanner. Then the origin on the rotary cylinder 1 is set by using a viewer provided on the scanner. As a result, the coordinate system of the image processing condition setting apparatus to which the image processing conditions have been set and the coordinate system of the prepress scanner are place in perfect agreement. Thus, the various image processing conditions prepared by the image processing condition setting apparatus along with positional information determining an image reproduction range (trimming range) are applicable as they are to the prepress scanner.

Figure 11:
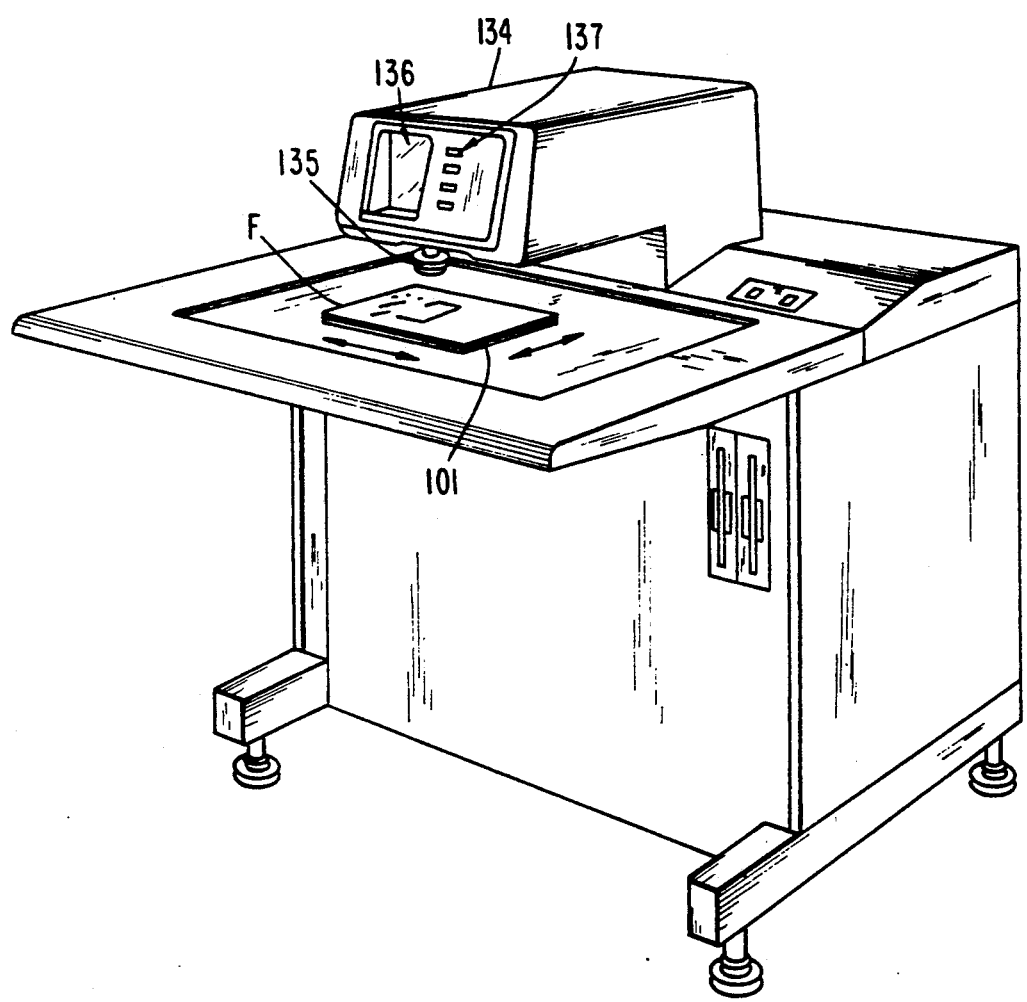
FIG. 11 is an image processing condition setting apparatus of the flat-bed scanning type according to the present invention.

The foregoing embodiment has been described presuming a prepress scanner of the rotation scanning type and taking an image processing condition setting apparatus of the rotation scanning type for example. For setting image processing conditions for a prepress scanner of the flat-bed scanning type, an image processing condition setting apparatus of the flat-bed scanning type having a document supporting table may be provided. FIG. 11 is a perspective view of such an image processing condition setting apparatus of the flat-bed scanning type. Numeral 101 in the drawing denotes a document table supporting the document F, which is driven horizontally by an unillustrated drive mechanism along two axes entending at right angles to each other. An image reading head 134 is opposed to the document table 101, with a pickup lens 135 disposed below the image reading head 134 and directed downwardly toward the document F. The image reading head 134 has a front panel disposed close to the pickup lens 135. This front panel includes a focusing screen 136 with a register cross and a register mark similar to those shown in FIG. 6, and a density indicator 137 arranged next to the focusing screen 136. This apparatus further comprises an optical system for projecting light transmitted through the document F and received by the pickup lens 135 to the pickup lens 135 to display a setup position and adjacent regions, and a construction for displaying density level of the setup position. These system and construction, and the sequence of a setup operation are the same as those in the foregoing image processing condition setting apparatus of the rotation scanning type, and are therefore not described again.

In the described embodiments, the image processing conditions set by the image processing condition setting apparatus are transferred to the image scanning and recording apparatus by means of a data floppy disk. Alternatively, the image processing conditions may be transferred by communication means or the like.

The present invention is applicable not only to prepress scanners but to other types of image scanning and recording apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing condition setting apparatus constructed separately from an image scanning and recording apparatus for transferring image processing conditions of a document to the scanning and recording apparatus, comprising:

document supporting means;

pickup means disposed above and directed downwardly toward the document supported by said document supporting means;

image checking means disposed adjacent said pickup means, said image checking means including a surface defining a register mark for visually checking by an operator a document density measurement range corresponding in size to or slightly larger than an aperture;

optical path splitting means for splitting incident light received thereby through said pickup means into two branched light beams, said optical path splitting means comprising a half mirror;

optical means for projecting one of the branched light beams as an erect imgage to said image checking means;

density measuring means for receiving through an aperture the other branched light beam and measuring density of the document, said aperture being disposed at a position optically equivalent to said image checking means; and density display means for displaying the density measured by said density measuring means.

2. The apparatus as recited in claim 1, wherein said density display means is disposed adjacent to said image checking means.

3. The apparatus as recited in claim 1, wherein said image processing condition setting apparatus is a rotation scanning type and comprises an image reading head; said document supporting means comprises a rotary cylinder; and said image checking means is provided on said image reading head, said image reading head being horizontally movable along an axis of said rotary cylinder.

4. The apparatus as recited in claim 3, wherein said image reading head is connected to a motor-driven steel belt.

5. The apparatus as recited in claim 1, wherein said image processing condition setting apparatus is a flatbed scanning type and comprises an image reading head; said document supporting means comprises a document table horizontally movable along two axes extending at right angles to each other; and said pickup means is provided on said image reading head, said image reading head being disposed above said document table.

6. The apparatus as recited in claim 1, wherein said pickup means comprises a pickup lens.

7. The apparatus as recited in claim 1, wherein said image checking means comprises a focusing screen.

* * * * *